(12) United States Patent
Jeong et al.

(10) Patent No.: US 9,358,909 B2
(45) Date of Patent: Jun. 7, 2016

(54) APPARATUS OF SIDE BOLSTER FOR GUIDING DEVELOPING DIRECTION OF SIDE AIRBAG

(71) Applicants: Hyundai Motor Company, Seoul (KR); HYUNDAI DYMOS INC., Seosan-Si (KR)

(72) Inventors: Dong Woo Jeong, Seongnam-si (KR); Hoon Bok Lee, Seoul (KR); Seok Nam Kang, Seoul (KR); Tae Hoon Lee, Seoul (KR); Sang Do Park, Suwon-si (KR); Seung Young Lee, Hwaseong-si (KR); In Ho Lee, Hwaseong-si (KR); Dong Gi Kim, Osan-si (KR); Sin Jeong Kang, Seoul (KR); Sung Hoon Kim, Seoul (KR)

(73) Assignees: Hyundai Motor Company, Seoul (KR); HYUNDAI DYMOS INC., Seosan-Si (KR)

( * ) Notice: Subject to any disclaimer, the term of this patent is extended or adjusted under 35 U.S.C. 154(b) by 0 days.

(21) Appl. No.: 14/548,194

(22) Filed: Nov. 19, 2014

(65) Prior Publication Data

US 2015/0239374 A1 Aug. 27, 2015

(30) Foreign Application Priority Data

Feb. 27, 2014 (KR) ........................ 10-2014-0023019

(51) Int. Cl.
*B60N 2/44* (2006.01)
*B60N 2/68* (2006.01)
*B60R 21/207* (2006.01)
*B60R 21/16* (2006.01)

(52) U.S. Cl.
CPC .............. *B60N 2/4415* (2013.01); *B60N 2/449* (2013.01); *B60N 2/68* (2013.01); *B60R 21/207* (2013.01); *B60R 2021/161* (2013.01)

(58) Field of Classification Search
CPC .... B60N 2/4415; B60N 2/449; B60N 2/4492; B60R 21/207; B60R 2021/161
See application file for complete search history.

(56) References Cited

U.S. PATENT DOCUMENTS

| | | | | | |
|---|---|---|---|---|---|
| 4,536,030 | A | * | 8/1985 | Sakurada | A47C 7/46 297/284.9 |
| 4,589,695 | A | * | 5/1986 | Isono | A47C 7/022 297/284.11 |
| 4,965,899 | A | * | 10/1990 | Sekido | A47C 7/021 297/284.11 |

(Continued)

FOREIGN PATENT DOCUMENTS

| | | |
|---|---|---|
| DE | 10 2011 116 634 A1 | 4/2013 |
| JP | 2008-143363 A | 6/2008 |

(Continued)

*Primary Examiner* — Paul N Dickson
*Assistant Examiner* — Timothy Wilhelm
(74) *Attorney, Agent, or Firm* — Morgan, Lewis & Bockius LLP (57) ABSTRACT

A side bolster adjusting apparatus of a seat of a vehicle for guiding a developing direction of a side airbag may include a side airbag developing direction guide plates integrally fixed to a seatback frame to guide a developing direction of the side airbag, side bolster adjusting plates hinged to rear ends of the side airbag developing direction guide plates, an airbag disposed between the side airbag developing direction guide plates and the side bolster adjusting plates to expand and shrink and to adjust positions of the side bolster adjusting plates, and a pneumatic control unit controlling expansion and shrinkage of the airbag.

10 Claims, 7 Drawing Sheets

(56) References Cited

U.S. PATENT DOCUMENTS

| | | | | |
|---|---|---|---|---|
| 5,137,329 | A * | 8/1992 | Neale | A47C 7/467 297/284.1 |
| 5,280,997 | A * | 1/1994 | Andres | A47C 7/467 297/284.6 |
| 6,129,419 | A * | 10/2000 | Neale | B60N 2/4415 297/284.4 |
| 7,708,343 | B2 * | 5/2010 | Kayumi | B60N 2/449 297/284.9 |
| 8,011,729 | B2 * | 9/2011 | Petzel | B60N 2/4415 297/284.1 |
| 8,136,883 | B2 * | 3/2012 | Rehfuss | B60N 2/4415 297/284.6 |
| 8,459,690 | B2 * | 6/2013 | Breuninger | B60R 21/207 280/730.2 |
| 8,474,862 | B2 * | 7/2013 | Pursche | B60R 21/0134 280/729 |
| 9,045,063 | B2 * | 6/2015 | Line | B60N 2/449 |
| 2007/0057551 | A1 * | 3/2007 | Lachenmann | B60N 2/449 297/284.9 |
| 2008/0191532 | A1 * | 8/2008 | Wain | B60N 2/449 297/284.1 |

FOREIGN PATENT DOCUMENTS

| | | |
|---|---|---|
| JP | 2011-93479 | 5/2011 |
| JP | 4952422 B2 | 6/2012 |
| KR | 10-2005-0008306 A | 1/2005 |
| KR | 10-0521582 B1 | 10/2005 |
| KR | 10-2006-0011769 | 2/2006 |
| KR | 10-2013-0053291 | 5/2013 |

* cited by examiner

APPARATUS OF SIDE BOLSTER FOR GUIDING DEVELOPING DIRECTION OF SIDE AIRBAG

CROSS-REFERENCE TO RELATED APPLICATION

The present application claims priority to Korean Patent Application No. 10-2014-0023019 filed on Feb. 27, 2014, the entire contents of which is incorporated herein for all purposes by this reference.

BACKGROUND

1. Field of the Invention

The present invention relates to a side bolster controller of a seat in a vehicle for guiding a developing direction of a side airbag. More particularly, it relates to a side bolster adjustor for adjusting inward and outward explosion and shrink of a side bolster of a seat to satisfy passenger's seating comfort and for guiding development of a side airbag installed in a seat in the direction where the passenger may be protected.

2. Description of Related Art

A side bolster of a vehicle seat protrudes from both of front sides of a seatback to support passenger's back and waist as wrapping.

A majority of the side bolsters is a fixed type, which discloses an adjustable side bolster for adjusting both of front sides of a seatback to protrude forward such that passenger's back and waist may be supported and seating comfort may be enhanced.

Inside the seatback, a side bolster and a side airbag developed to protect passenger's sides at collision of a vehicle are installed.

It is preferred that the side airbag, which is installed in the seatback at the side collision, is developed forward a space between the sides of a passenger and a front door of a vehicle for the effective protection of the passenger.

However, if there is not a device guiding the developing direction of the side airbag, the side airbag may be developed toward a center pillar (B-pillar) making a boundary between a front door and a rear door or inward the seatback so that the side airbag may be developed in the direction where a passenger cannot be protected.

In order to solve the above-mentioned problem, an airbag developing guide of a side airbag of a vehicle is generally disclosed for guiding a side airbag in the direction where a passenger may be protected.

As such, since the side airbag developing guide and the side bolster adjuster are installed in the seat separately in the existing devices, the number of parts increases and the assembling process thereof may be complicated and manufacturing costs should be increased.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a side bolster adjusting apparatus of a seat of a vehicle, in which the side bolster installed in a seatback and a developing guide of a side airbag are integrated, capable of guiding the side airbag, which is installed in the seat, in the direction where a passenger can be protected.

In accordance with an aspect of the present invention, there is provided a side bolster adjusting apparatus of a seat of a vehicle for guiding a developing direction of a side airbag, the apparatus including a side airbag developing direction guide plates integrally fixed to a seatback frame to guide a developing direction of the side airbag, side bolster adjusting plates hinged to rear ends of the side airbag developing direction guide plates, an airbag disposed between the side airbag developing direction guide plates and the side bolster adjusting plates to expand and shrink and to adjust positions of the side bolster adjusting plates, and a pneumatic control unit controlling the expansion and shrinkage of the airbag.

Preferably, the side airbag developing direction guide plates are arranged near inside and front positions of the side airbag and obliquely toward between sides of the passenger and doors.

According to an embodiment of the present invention, each of the side airbag developing direction guide plates may include a hook integrally formed at a front end thereof and pressed into a supporting wire connected to the seatback frame, while a rear end thereof is bolted to the seatback frame.

According to another embodiment of the present invention, each of the side airbag developing direction guide plates may include a front end of arranged as a free end, and a rear end may have a bolt coupling end closely attached to an inner surface of the seatback frame and a closely attaching end closely attached to an outer surface of the seatback frame, while the bolt coupling end and the closely attaching end are spaced apart from each other and integrally formed with each other.

According to still another embodiment of the present invention, the side airbag developing direction guide plates are integrally molded to protrude from both sides of the seatback frame when the seatback frame is manufactured.

Preferably, the pneumatic control unit may include a pneumatic pump serving as an air source, a pneumatic valve supplying and interrupting air from the pneumatic pump, and a controller controlling opening/closing of the pneumatic vale and turning on/off of the pneumatic pump based on a signal of a switch manipulated by a passenger.

The apparatus of side bolster for guiding developing direction of side airbag according to the present invention has the following effects.

First, the side bolster adjusting plate hinged to the side airbag developing direction guide plate rotates toward sides of a passenger by an angle and explodes the side bolster of the seatback so that a supporting force wrapping passenger's back and waist can be easily controlled at a degree satisfied by the passenger.

Second, on the contrary to the fact that the existing apparatus utilizes only an airbag so that the explosive force of the airbag pushes a passenger resulting in rather uncomfortable seating, the apparatus according to the present invention may provide comfortable seating using the supporting force of the side bolster adjusting plate and comfortable supporting feeling and satisfied seating position to passengers with various body types.

Third, the development of the side airbag installed in the seat is guided in the direction where a passenger is protected (into a space between sides of the passenger and the front doors) when the side airbag is exploded so that the cushion performance of the side airbag against the passenger waist can be guaranteed at the side collision.

Fourth, since the side bolsters adjuster installed in the seatback and a developing direction guide of the side airbag are integrated, reduction of the number of parts, manufacturing costs, weight, and the assembling process can be achieved.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, the present invention will be described in detail so that those skilled in the art to which the present invention pertains can easily carry out the present invention.

The present invention is characterized in that a side bolster adjuster installed in a seatback and a developing direction guide of a side airbag are integrated to satisfy passenger's seating comfort and to guide development of a side airbag installed in a seat in the direction where the passenger may be protected.

Figure 1:
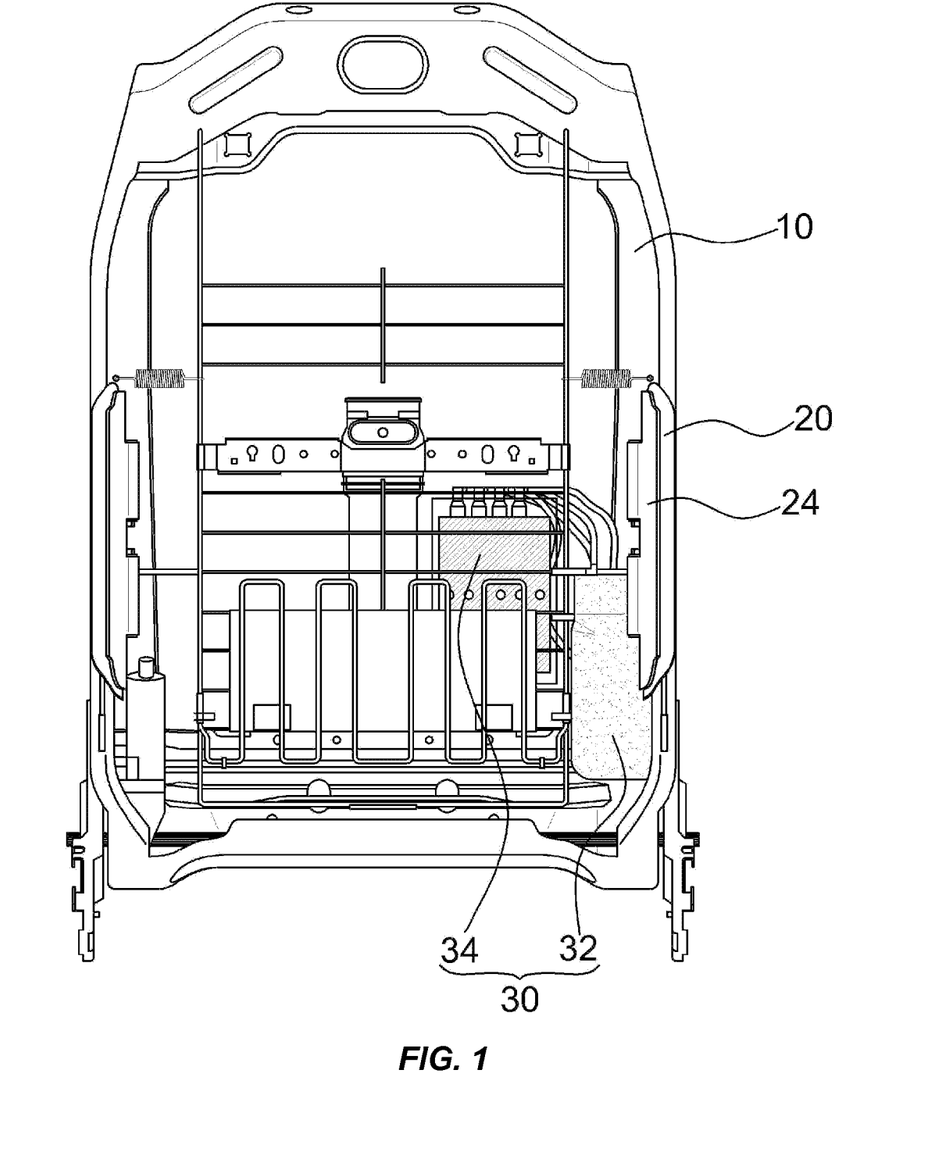
FIG. 1 is a front view illustrating a side bolster adjusting apparatus of a vehicle according to an exemplary embodiment of the present invention.
Figure 2:
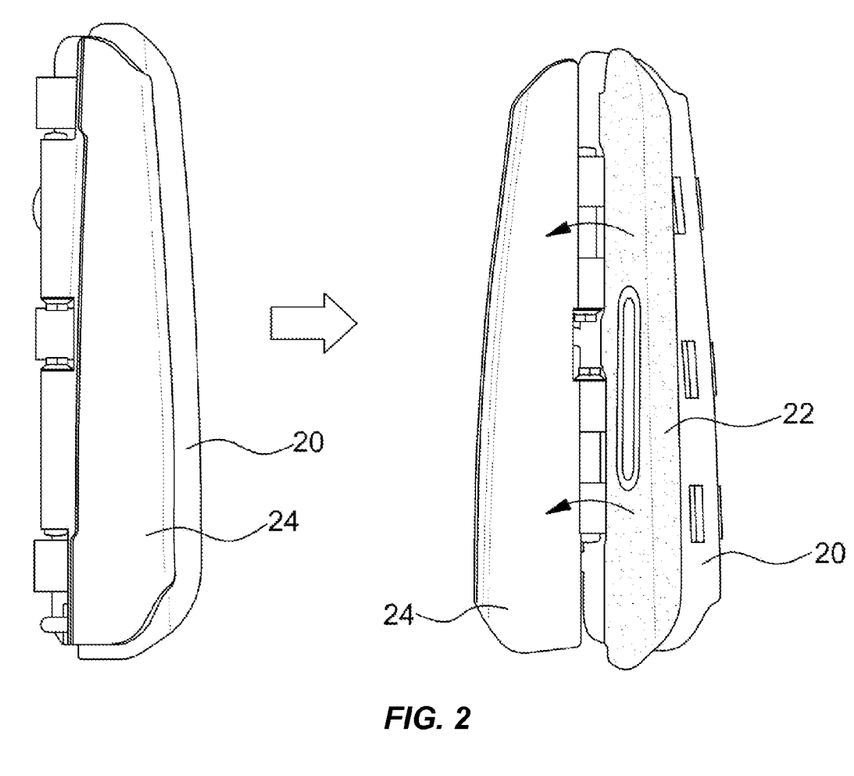
FIG. 2 is a perspective view illustrating operations of the side bolster adjusting apparatus according to an exemplary embodiment of the present invention.

FIG. 1 is a front view illustrating a side bolster adjusting apparatus of a vehicle according to an exemplary embodiment of the present invention. FIG. 2 is a perspective view illustrating operations of the side bolster adjusting apparatus according to an exemplary embodiment of the present invention.

A reference numeral '10' of FIG. 1 indicates a seatback frame.

To both front side ends of the seatback frame 10, side airbag developing guide plates 20 guiding development of the side airbag in a preset direction are integrally fixed.

In this case, the side airbag developing guide plates 20 are arranged at the inside front positions of side airbags that are installed at outer sides of the seatback frame 10 (at the rear side of a side bolster).

The side airbag developing direction guide plates 20 are obliquely arranged such that portions from the rear sides (the inner portions) to the front ends (the outer portions) direct outside, preferably between sides of a passenger and front doors.

The side airbag developing direction guide plates 20 must be secured to the seatback frame 10 and may be fixed to the seatback frame in various manners according to types of the seatback frame.

Figure 3:
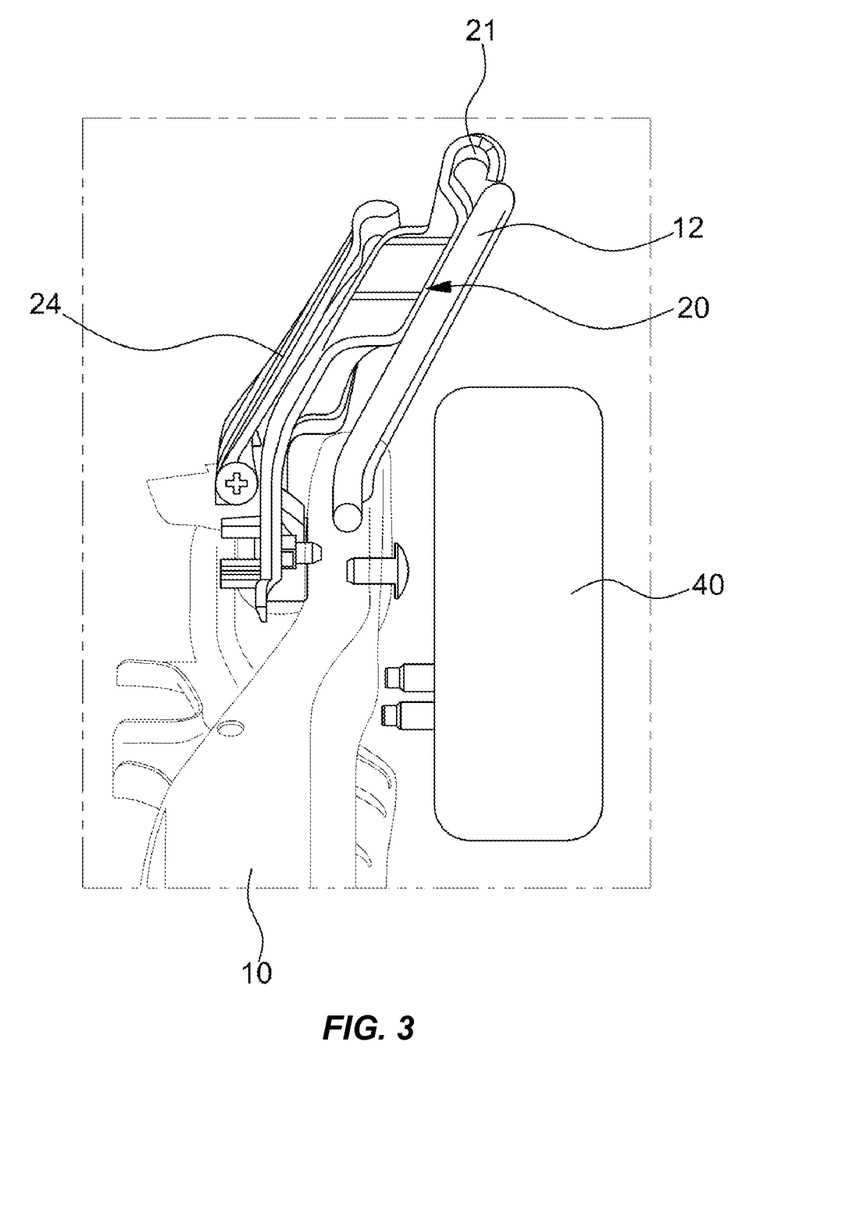
FIG. 3 and FIG. 4 are sectional views illustrating the side bolster adjusting apparatus of a vehicle seat according to the exemplary embodiment of the present invention.
Figure 4:
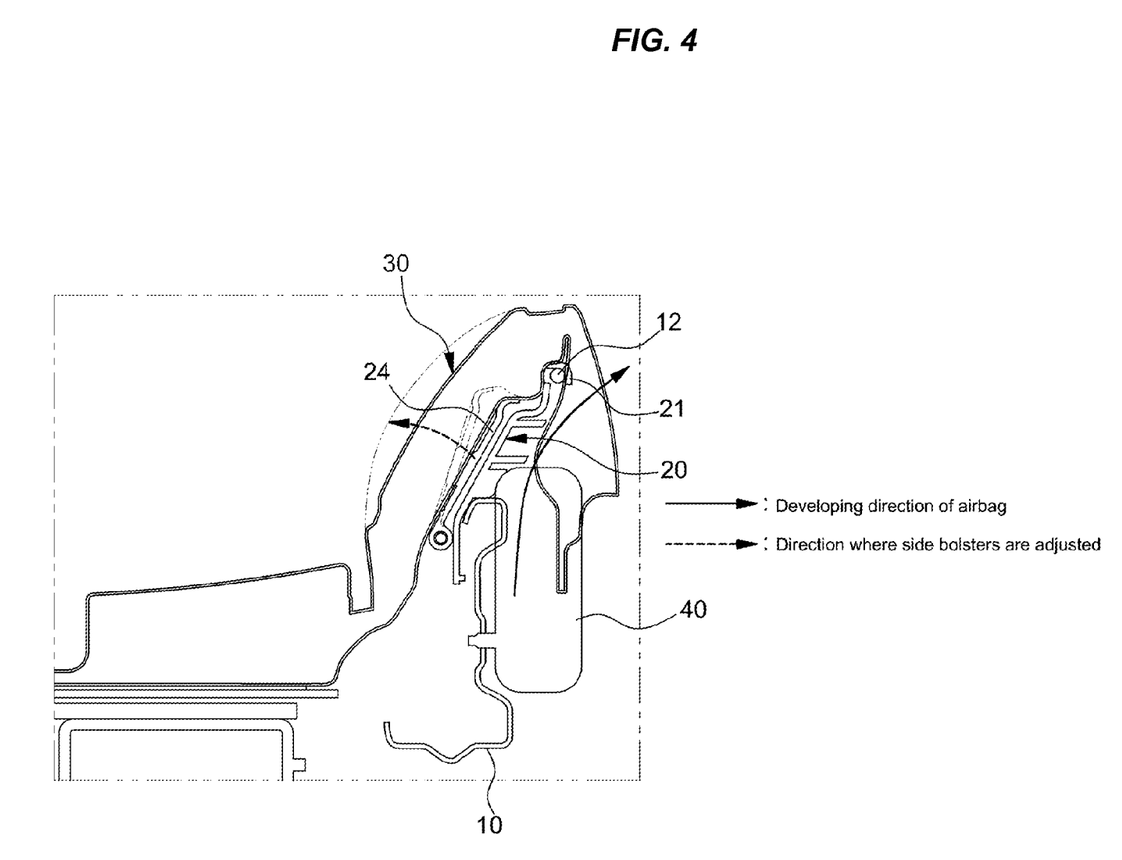

Referring to FIGS. 3 and 4, when supporting wires 12 are integrally connected to both sides of the seatback frame 10, the side airbag developing direction guide plates 20 according to an exemplary embodiment of the present invention is configured such that hooks 21, in which the supporting wires 12 are pressed into the front ends thereof, are integrally formed.

Thus, the supporting wires 12 connected to the seatback frame 10 are pressed into the hooks 21 of the side airbag developing direction guide plates 20 according to an exemplary embodiment of the present invention and the rear ends of the side airbag developing direction guide plates 20 are bolted to the seatback frame, so that the side airbag developing direction guide plates 20 are securely fixed to the seatback frame 10.

Figure 5:
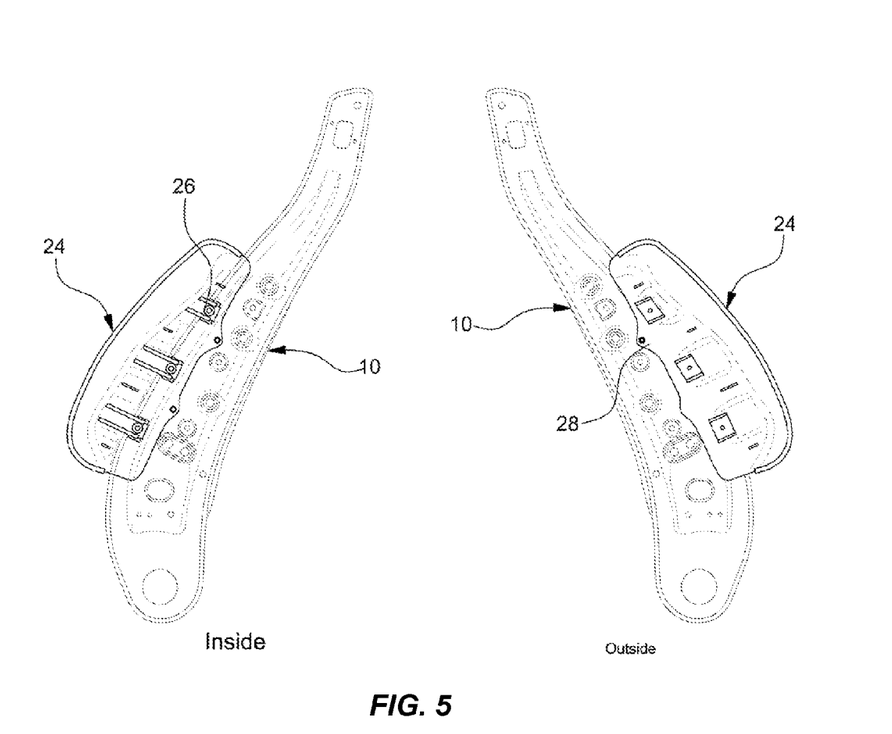
FIG. 5 is a view illustrating another example of a side airbag developing direction guide plate of the side bolster adjusting apparatus of a vehicle seat according to the exemplary embodiment of the present invention.
Figure 6:
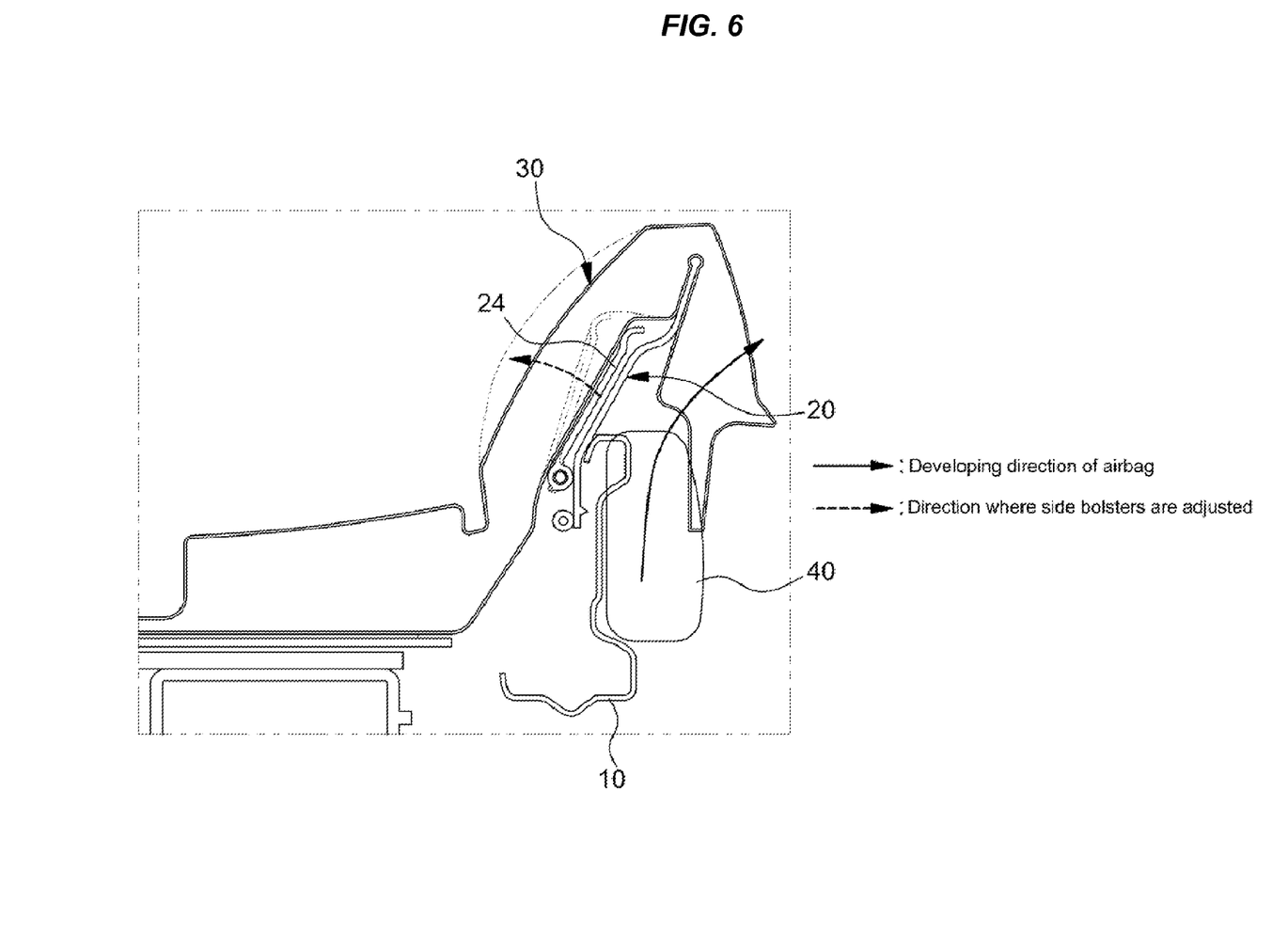
FIG. 6 is a sectional view illustrating the side bolster adjusting apparatus to which the side airbag developing guide plate of FIG. 5 is employed.

Referring to FIGS. 5 and 6, if the supporting wires 12 do not exist at the both sides of the seatback frame 10, the side airbag developing direction guide plates 20 according to an exemplary embodiment of the present invention is configured such that the front ends thereof are arranged as free ends and bolt coupling ends 26 closely coupled to the inner sides of the seatback frame 10 and closely attaching ends 28 closely attached to the outer sides of the seatback frame 10 are integrally formed with each other while being spaced apart from each other.

Then, the seatback frame 10 is inserted between the bolt coupling ends 26 and the closely attaching ends 28 of the side airbag developing direction guide plates 20, the bolt coupling ends 26 are bolted to the seatback frame 10 such that the side airbag developing direction guide plates 20 are securely fixed to the seatback frame 10.

Figure 7:
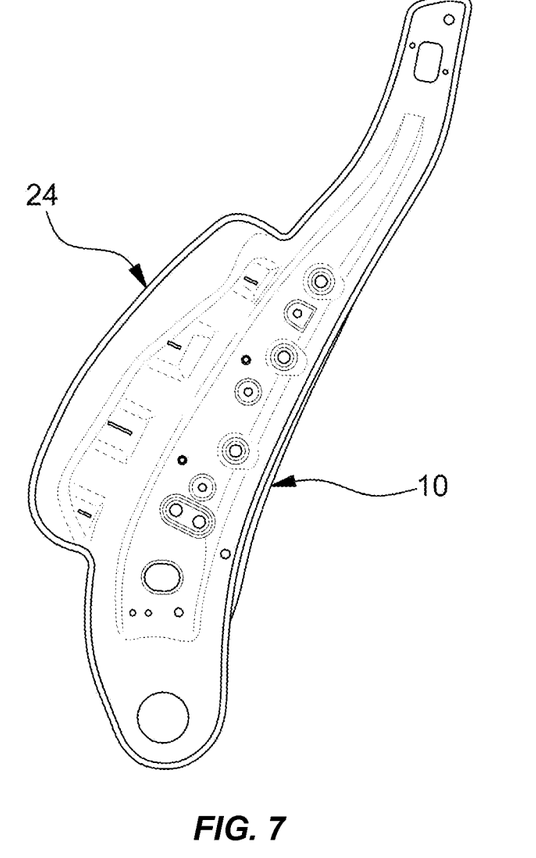
FIG. 7 is a view illustrating another example of the side airbag developing direction guide plate of the side bolster adjusting apparatus of a vehicle seat according to the exemplary embodiment of the present invention.

Referring to FIG. 7, side airbag developing direction guide plates 20 according to another embodiment of the present invention are integrally formed to both sides of the seatback frame when the seatback frame 10 is molded.

In more detail, a mold for the seatback frame 10 is modified to include the side airbag developing direction guide plates 20 so that the seatback frame 10 is molded such that the side airbag developing direction guide plates 20 are integrally formed with both sides of the seatback frame 10 when the seatback frame 10 is molded.

As such, the side airbag developing direction guide plates 20 are integrally formed when the seatback frame 10 is molded, so that manufacturing process and assembling process can be reduced differently from the assembly of the side airbag developing direction guide plates 20 according to an exemplary embodiment and another embodiment of the present invention as separated parts.

The airbag developing direction guide plates 20 according to the exemplary embodiments of the present invention guide a side airbag 40 installed in the seatback in a preset developing direction where a passenger can be protected (into a space between sides of the passenger and the front doors) to guarantee the cushion performance of the side airbag against the passenger's sides at the side collision.

Rear ends of side bolster adjusting plates 24 are hinged to the rear ends of the side airbag developing direction guide plates 20 and an airbag 22 is disposed between the side airbag developing guide plates 20 and the side bolster adjusting plates 24 to explode and shrink.

Thus, the side bolster adjusting plates 24 rotate inward the seatback by an angle, when the airbag 22 is exploded, to make side bolsters 50 protrude toward the sides of the passenger, while the side bolster adjusting plates 24 rotate outward the seatback by an angle and are closely attached to the side airbag developing direction guide plates 20 when the airbag 22 is shrunk.

A pneumatic control unit 30 controlling air supplied into the airbag 22 to control the explosion and the shrinkage of the airbag 22 is installed in the seatback.

The pneumatic control unit 30 includes a pneumatic pump 32 serving as an air source to supply air into the airbag 22 and a pneumatic valve/controller 34 controlling ON/OFF of the pneumatic pump 32 and opening/closing a passage through which air flows from the pneumatic pump 32. The pneumatic pump 32 and the pneumatic valve/controller 34 are fixed to the seatback frame 10.

In this case, the pneumatic valve/controller 34 is configured such that a pneumatic valve supplying and interrupting air from the pneumatic pump 32 and a controller controlling operation of the pneumatic valve and ON/OFF the pneumatic pump are integrated.

Moreover, the pneumatic control unit 30 includes a switch manipulated by a passenger, wherein the pneumatic valve/controller 34 receives a switching signal from the switch to control opening/closing of the pneumatic valve and ON/OFF of the pneumatic pump.

The sequence of operations of the side bolster adjusting apparatus of a vehicle seat configured as described above will be described as below.

Guiding of Developing Direction of Side Airbag

The side airbag 40 is developed at the side collision of a vehicle, and at the same time makes a contact with an outer surface (a surface obliquely arranged outwardly from the rear ends to the front ends) of the side airbag developing direction guide plates 20 according to the exemplary embodiments of the present invention.

At this time, the side airbag 40 is guided in the developing direction when being in contact with the side airbag developing direction guide plates 20.

That is, as illustrated in FIG. 4, the side airbag 40 is developed in the direction where a passenger is protected along the outer surfaces of the side airbag developing direction guide plates 20 (into the space between the sides of the passenger and the front doors), so that cushion for the sides of the passenger can be easily achieved at the side collision.

Adjustment of the Side Bolster

First, when a passenger manipulates the switch to adjust the side bolsters, the pneumatic valve/controller 34 receives a switch signal generated at this time to drive the pneumatic pump 32 and to control the pneumatic valve open.

Then, air is supplied from the pneumatic pump 32 to the airbag 22 and the airbag is expanded at the same time.

As shown in FIG. 4, the expansive force of the airbag 22 makes the side bolster adjusting plates 24 rotate inward the seatback by an angle when the airbag 22 is expanded and the side bolsters 50 protrude toward the sides of the passenger.

Thus, the side bolsters 50 protrude and support the passenger's back and waist like as wrapping them and the passenger turns off the switch when the passenger feels desired comfort seating so that the expansion of the side bolsters 50 is completed.

In this situation, the side bolster adjusting plates 24 support the side bolsters 50 so that the comfort seating of the passenger achieved the side bolsters wrapping the passenger can be maintained.

On the contrary, at the shrinkage when air in the airbag 22 is exhausted out by the reverse operation of the pneumatic pump 32, the side bolster adjusting plates 24 are rotated outward the seatback to the original positions, due to an elastic restoring force of the side bolsters 50, by an angle and closely attached to the side airbag developing direction guide plates 20.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A side bolster adjusting apparatus of a seat of a vehicle for guiding a developing direction of a side airbag, the apparatus comprising:
   a side airbag developing direction guide plates integrally fixed to a seatback frame to guide a developing direction of the side airbag;
   side bolster adjusting plates hinged to rear ends of the side airbag developing direction guide plates;
   an airbag disposed between the side airbag developing direction guide plates and the side bolster adjusting plates to expand and shrink and to adjust positions of the side bolster adjusting plates; and
   a pneumatic control unit controlling expansion and shrinkage of the airbag,
   wherein each of the side airbag developing direction guide plates includes a hook integrally formed at a front end thereof and pressed into a supporting wire connected to the seatback frame, while a rear end thereof is bolted to the seatback frame.

2. The side bolster adjusting apparatus of claim 1, wherein the side airbag developing direction guide plates are arranged near inside and front positions of the side airbag and obliquely toward between sides of a passenger and doors.

3. The side bolster adjusting apparatus of claim 1, wherein each of the side airbag developing direction guide plates includes a front end of arranged as a free end, and a rear end has a bolt coupling end closely attached to an inner surface of the seatback frame and a closely attaching end closely attached to an outer surface of the seatback frame, while the bolt coupling end and the closely attaching end are spaced apart from each other and integrally formed with each other.

4. The side bolster adjusting apparatus of claim 1, wherein the side airbag developing direction guide plates are integrally molded to protrude from both sides of the seatback frame when the seatback frame is manufactured.

5. The side bolster adjusting apparatus of claim 1, wherein the pneumatic control unit comprises:
- a pneumatic pump serving as an air source;
- a pneumatic valve supplying and interrupting air from the pneumatic pump; and
- a controller controlling opening/closing of the pneumatic vale and turning on/off of the pneumatic pump based on a signal of a switch manipulated by a passenger.

6. A side bolster adjusting apparatus of a seat of a vehicle for guiding a developing direction of a side airbag, the apparatus comprising:
- a side airbag developing direction guide plates integrally fixed to a seatback frame to guide a developing direction of the side airbag;
- side bolster adjusting plates hinged to rear ends of the side airbag developing direction guide plates;
- an airbag disposed between the side airbag developing direction guide plates and the side bolster adjusting plates to expand and shrink and to adjust positions of the side bolster adjusting plates; and
- a pneumatic control unit controlling expansion and shrinkage of the airbag, wherein each of the side airbag developing direction guide plates includes a front end of arranged as a free end, and a rear end has a bolt coupling end closely attached to an inner surface of the seatback frame and a closely attaching end closely attached to an outer surface of the seatback frame, while the bolt coupling end and the closely attaching end are spaced apart from each other and integrally formed with each other.

7. The side bolster adjusting apparatus of claim 6, wherein the side airbag developing direction guide plates are arranged near inside and front positions of the side airbag and obliquely toward between sides of a passenger and doors.

8. The side bolster adjusting apparatus of claim 6, wherein each of the side airbag developing direction guide plates includes a hook integrally formed at a front end thereof and pressed into a supporting wire connected to the seatback frame, while a rear end thereof is bolted to the seatback frame.

9. The side bolster adjusting apparatus of claim 6, wherein the side airbag developing direction guide plates are integrally molded to protrude from both sides of the seatback frame when the seatback frame is manufactured.

10. The side bolster adjusting apparatus of claim 6, wherein the pneumatic control unit comprises:
- a pneumatic pump serving as an air source;
- a pneumatic valve supplying and interrupting air from the pneumatic pump; and
- a controller controlling opening/closing of the pneumatic vale and turning on/off of the pneumatic pump based on a signal of a switch manipulated by a passenger.

* * * * *